United States Patent Office 3,202,976
Patented Aug. 24, 1965

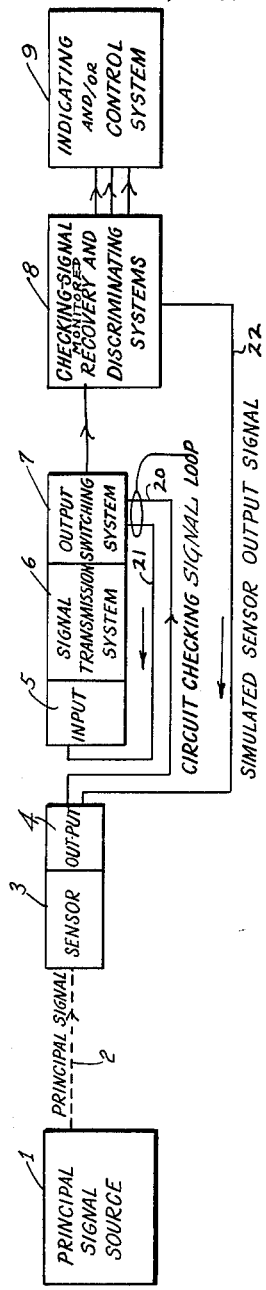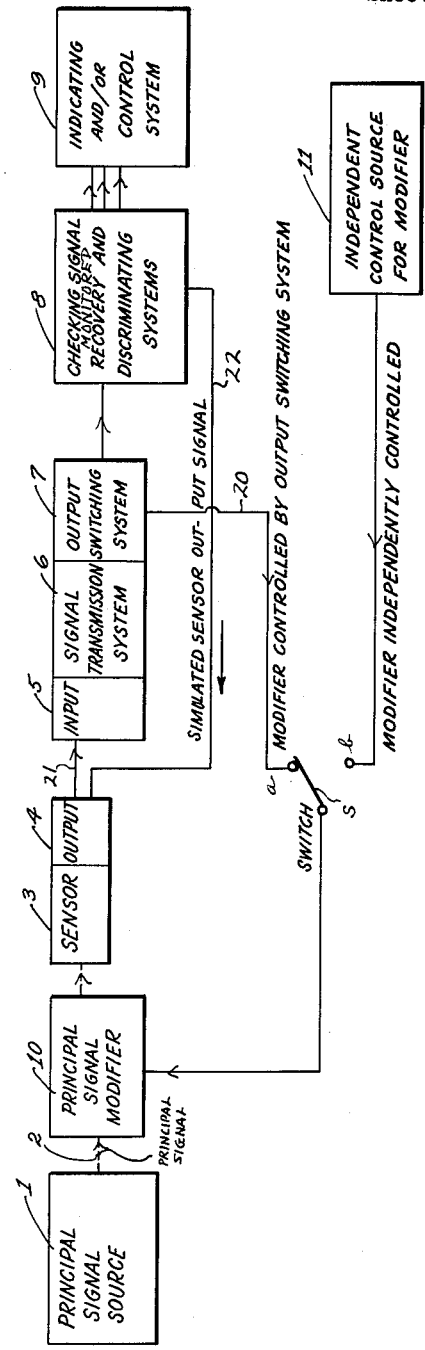

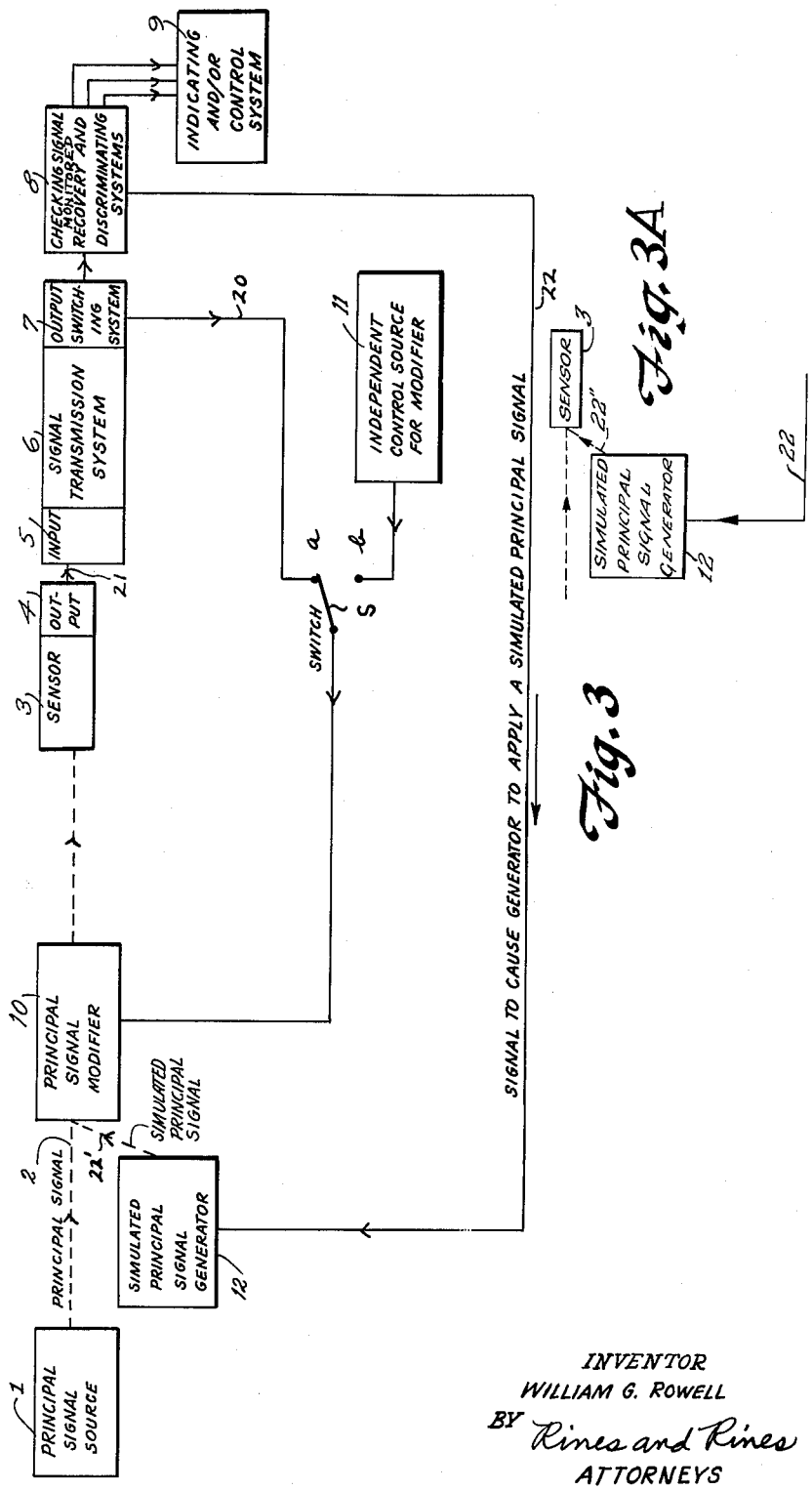

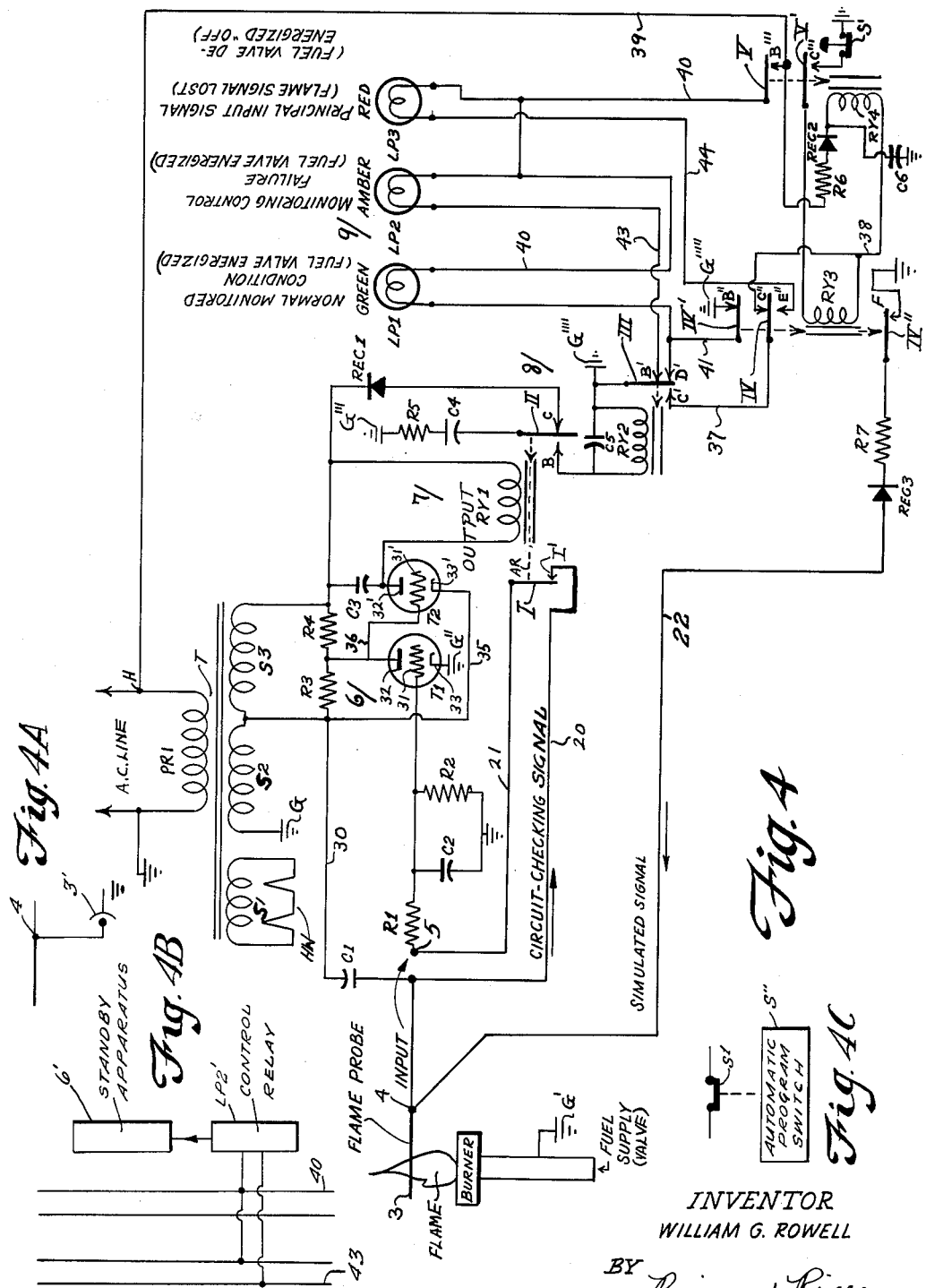

3,202,976
SUPERVISORY SYSTEM WITH FAILURE
DISCRIMINATION
William G. Rowell, Quincy, Mass., assignor to Scully
Signal Company, Melrose, Mass., a corporation of
Massachusetts
Filed Dec. 3, 1959, Ser. No. 857,080
21 Claims. (Cl. 340—213)

The present invention relates to methods of and systems for automatically discriminating beween a failure within a signal transmission system of any type, and a failure of the signal itself that is to be applied to the system.

In process or other monitoring systems, and, in fact, in supervisory systems of all kinds, as well as detection systems, control systems, alarm systems, and the like, all generically referred to herein as signal transmission systems, an acute problem relating to false alarms, nusiance and false shutdowns continues to plague the industry. While such unnecessary shut-downs, caused by the failure of the control or monitor, as distinguished from failure of the process or condition being controlled or monitored, desirably result in a safe failure, the ultimate end result can, in some instances, be costly or otherwise uneconomic, since the shut-down will interrupt a properly operating process or condition.

Proper utilization of the present invention requires that the system with which it is associated must, in itself, provide an indication, under all conditions, when it fails for any reason at all; the term "indication" being generically employed herein to embrace not only visual, audible or recorded indications, but also control or other signals or other manifestations that are indicative that a failure has occurred. Suitable fail-safe control systems are described, for example, in United States Letters Patents Nos. 2,798,213; 2,798,214; 2,807,008; 2,807,009; 2,807,010 and 2,807,011, issued to William G. Rowell.

Present-day commercial monitoring systems, with the exception of those employing the techniques disclosed in the Letters Patent enumerated above, cannot provide a completely reliable signal when failure of certain components in the system takes place. As an example, consider a simple "on" and 'off" type of monitoring control that functions to provide an "on" signal when a principal signal representative of the condition that it is monitoring, is present at its input. The control must also function to give an "off" signal when the principal input signal is lost. Inherent in such controls, however, is the possibility of failure of certain components in the system which will then cause either a false signal, or no signal at all to be produced. Thus, the control can fail in two ways—safe or unsafe; the safe failure occurring when the control goes to the "off" position, and the unsafe failure occurring when the control remains in the "on" position. When an unsafe failure occurs, therefore, no indication whatever is given that the control is completely inoperative and unable to detect the condition it is intended to monitor.

Accordingly, it is a requisite for full utilization of the present invention, that it be employed only in connection with fail-safe systems that have the performance characteristics of the type above referred to and disclosed in the Letters Patent before enumerated. The control or monitoring system must produce a failure signal regardless of any component failure that may occur and irrespective of whether the failure be of a safe or unsafe variety.

An important object of the present invention is to provide a novel method of and system for automatically checking the operation of a signal transmission system of any type, such as monitoring systems and the like, upon receipt of a failure signal, to determine and thereby indicate whether it is the system which failed or whether it is the principal signal itself, representative of the condition to be monitored or the like, that failed to appear at the input of the system.

A further object is to provide such a technique and system for failure discrimination that is particularly useful in electrical, electronic, hydraulic, mechanical or electro-mechanical transmission systems, control systems, supervising systems and the like.

An additional object is to provide a system for accomplishing the above objects that shall be inexpensive though completely reliable, relatively simple and readily adaptable to existing fail-safe systems, especially of the types disclosed in the above-mentioned Letters Patent.

Other and further objects will be explained hereinafter and will be more particularly pointed out in the appended claims.

The invention will now be described in connection with the accompanying drawing, FIG. 1 of which is a block diagram illustrating the principle of operation of the invention applied one form a fail-safe transmission system;

FIG. 2 is a block diagram illustrating the invention embodied in a second form of a fail-safe transmission system;

FIG. 3 is a block diagram of still a third form of a fail-safe transmission system, FIGURE 3A illustrating a variation;

FIG. 4 is a detailed schematic diagram of a preferred form of the invention, applied, for disclosure purposes, to the signal transmission system shown in the block diagram of FIG. 1, variations being illustrated in FIG. 4A, 4B, and 4C. It is to be understood, however, that the application of the invention to the system disclosed in FIG. 1 is but one of the host of forms of systems to which the invention is applicable.

Referring, now, to FIG. 1, there is disclosed a principal signal source 1 that provides a principal signal along the path 2. As but a signal illustration, the source 1 could be a flame, as later described in connection with the embodiment of FIG. 4, or it could be a signal generator or other event or condition producer to be detected or sensed, as described in the said Letters Patent. The signal is directed upon a sensor or detector or receiver 3 the output 4 of which feeds a transmission system 6, such as an amplifier system or any other system having an input 5. An output switching system 7, later described, is provided, feeding a novel checking-signal recovery and discriminating system 8, and, finally, operating an indicating or control system 9, referred to generically, as indicator apparatus. Upon application of the principal signal along path 2 to the sensor 3, the sensor supplies an output signal, by path 20, first to the output 7 of the signal transmission system 6. The sensor output signal is then fed along path 21 to the input 5 of the signal transmission system 6. This signal is then transmitted through the signal transmission system 6 to actuate the output switching system 7. The output switching system 7 thereupon responds, placing a predetermined form of modification or modulation on the signal fed along the path 21 to the input 5, which modification is then retransmitted through the system 6 to the output 7 again. The output switching system 7 will then respond to this modified signal to restore the output signal from the sensor 3 to its original form and to reapply this principal signal to the input 5 of the signal transmission system 6. This repetitive action thereby provides a periodic checking signal, which cannot exist in the absence of the principal signal, and to which the before-mentioned checking signal recovery and discriminating system 8 may respond. Inasmuch as this checking technique is fully disclosed in, for example, the said United States Patent No. 2,798,213, and will be later more fully explained in connection with the embodiment of FIG. 4, further explanation of the circuit-checking aspects is not here required.

The discriminating portion of the system 8, in accordance with the present invention, upon receiving a signal from the checking signal recovery part of the system 8, functions to provide an indication of normal operation to the indicating or control system 9. In the event of failure by the checking signal recovery system to recover the checking signal, the discriminating system will apply a simulated sensor output signal, along path 22, to the output 4 of the sensor 3, or directly to the input 5 of the signal transmission system 6, if desired. If the signal transmission system 6 has failed, this simulated signal will not, as later explained, activate the system 6. If the signal transmission system 6 has not failed, however, it will react normally to this simulated signal. The resultant signals from either of these conditions will be translated by the discriminating system 8 which will then act to provide a proper indication in the indicating or control system 9, of which type of failure occurred. This may, for example, then cause a standby control indication to be actuated if the failure was caused by a failure of the signal transmission system 6, or provide an alarm indication if the failure was caused by loss of the principal signal at the input 5.

Turning to FIG. 2, it will be noted that there is employed a principal-signal modifier 10, external to the system 6 and sensor 3, comprising a two-position switch S, and an independent external control source 11. In this embodiment, a fail-safe system is provided wherein the principal signal is supplied with a checking modification ahead of the sensor 3, whereas in the system of FIG. 1, the checking modification was applied to the principal output signal of the sensor 3, as before explained. When the switch S is in position a, the signal modifier 10 is controlled by the signal output switching system 7. When the switch is in position b, however, the modifier 10 is controlled by the independent source 11. The principal signal modifier 10 may be of the types described in the said Letters Patent or of any other appropriate type such as, for example, a disk, not shown, having opaque sections and which, when caused to rotate, either by the output-switching system 7 or the control source 11, will modulate or modify the principal signal transmitted along the path 2, thus to apply the circuit-checking modification or modulation. The operation of the discriminating and indicating or control system of FIG. 2 is essentially the same as described in connection with the system of FIG. 1.

In the embodiment of FIG. 3, on the other hand, a still further alternative modification is illustrated in order to demonstrate the wide versatility of the invention. A new element 12 has been added in FIG. 3 to the systems shown in FIGS. 1 and 2; namely, means for simulating the principal signal 2 itself emanating from the principal signal source 1. As disclosed in, for example, the above-mentioned Letters Patent No. 2,798,214, the checking signal must be applied ahead of the first component in the system that can fail unsafe. This is necessary if maximum fail-safe protection is to be assured. The sensor 3 of FIG. 3, for example, may be of the type that can inherently produce an unsafe failure. By applying a simulated principal signal ahead of, or at the input of, the sensor 3, therefore, the sensor 3 may be checked along with the rest of the components in the system through use of the simulated principal signal, which should have the same characteristics as the principal signal itself. If, for example, the monitored principal signal is infrared energy or heat, the simulated signal could be obtained from the electrical heating element at 12. If, on the other hand, the monitored principal signal is ultraviolet radiation, as another illustration, a small electric arc at 12 would produce the simulated principal signal. If, as still an additional example, the monitored principal signal is visible radiation, a light bulb could be utilized at 12; and so on. The operation of FIG. 3 is otherwise similar to that of FIG. 2 except that the feed-back output signal of the discriminating system, along paths 22 and 22' (or, alternatively, as shown in FIGURE 3A, paths 22 and 22"), is in the form of a simulated input principal signal to the signal modifier 10 (or, alternatively, to the sensor 3), as contrasted with the systems of FIGS. 1 and 2 wherein the output signal from the discriminator 8 is in the form of a simulated sensor output signal.

Referring, now, to the preferred system of FIG. 4, a flame-monitoring circuit is disclosed, for purposes of illustratiton, employing one form of the fail-safe technique, previously discussed, and to which the failure discriminating technique of this invention has been applied. A flame probe sensor 3 is shown connected to the input 5 of the signal transmission amplifier system 6, the circuit of which passes through the normally closed switch contact members I and I', controlled by the armature AR of a relay RY1 disposed in the amplifier output 7. A photo-emissive cell sensor 3', shown in FIGURE 4A, could also be used to sense the flame condition or event, as could a thermocouple or other type of flame sensor having fail-safe characteristics. The signal transmission system 6 contains a conventional type of D.C. amplifier, comprising, for example, electron tubes T1 and T2, the operation of which will be more fully explained hereinafter. The output 7 of the amplifier system 6 contains not only the switching system relay RY1 and its armature-controlled switch I, but, also, the armature-controlled switch II co-operating with contact members B and C. A checking-signal recovering system 8, comprising relay RY2 and integrating capacitor C5, is shown responsively connected to the contact member B of the amplifier output switching relay RY1. A discriminating system is also included at 8 comprising the sequence or memory relays RY3 and RY4 with their associated circuits to which intelligence signals are transmitted from relay RY2. Associated with the sequence relays RY3 and RY4 is a reset switch S' through which the sequence relays RY3 and RY4 electrically lock up and remain energized, once they are initially energized. In the event automatic program sequencing is used in place of the illustrated manual operation, the manually operated reset switch S' could be replaced with well-known automatic reset switching means, schematically shown at S" in FIGURE 4C, as part of the programming mechanism. The indicating system 9 shown consists of three signal lamps LP1, LP2 and LP3, producing visual manifestations, to denote a normal monitored condition, control failure and principal input signal failure, respectively, thereby to discriminate the kind of failure. This signaling system is under control of the checking signal recovery relay RY2 and the sequence relays RY3 and RY4 of the discriminating system 8.

It is important to point out at this point that it is to be understood that indication control relays, such as RY3 and RY4, could equally as well be used either in conjunction with the visual signaling indicating system 9, or without it, to perform indicating control functions, alarm functions, or both, or any other desirable function, as explained in the said Letters Patent. In the event that the monitoring control failed, for example, and not the monitored principal signal, it may be desirable to actuate an alarm and automatically switch on, in well-known manner, a standby monitoring control 6' as shown in FIGURE 4B, rather than stop the process being monitored. Such a function would automatically be performed by use of the control relays mentioned above. A relay LP2', as shown connected to the LP2 circuit, for instance, could be adapted readily to perform this function. As a further step in the direction of safety, such standby monitoring control could be rendered self-checking during standby periods through use of the techniques disclosed in the above-enumerated Letters Patent.

NORMAL OPERATING CONDITION—FIG. 4

It now remains to describe, in detail, the operation of the system of FIG. 4. With a burner flame event established, a small D.C. current of negative polarity is established at the output terminal 4 of the flame probe sensor 3. It is well known in the art, as explained in the said Letters Patent, that a flame will have rectifying characteristics if an alternating-current ("A.C.") potential is applied to it. The A.C. potential supplied to the flame is traced in FIG. 4 from ground terminal G through the secondary winding S2 of transformer T, by conductor 30 through capacitor C1 to the flame probe 3, through the flame to the burner B producing the flame, and back to ground at G'. The secondary winding S2, and also a heater winding S1 for the heaters HW of the amplifier tubes T1 and T2 and a further winding S3, are energized from a primary winding PR1 of the transformer T that may be connected to the mains, labelled "A.C. Line." The resulting negative potential at the output 4 of the flame probe 3 (or photocell 3', or whatever suitable sensor may be used), is applied at the input circuit 5 to the input or control grid 31 of electron tube T1 by conductor 20 and through resistor R1, when switch member I contacts the contact I' of relay RY1. This prevents tube T1 from normally conducting. Tube T2 will, however, conduct when T1 is cut off, due to the voltage divider network arrangement comprising resistors R3 and R4, connected across the further winding S3. The grid 31' of tube T2 is connected to the anode or plate 32 of tube T1 by conductor 36, and thence to the junction of R3 and R4, and the cathode 33' of the tube T2 is connected to the left-hand terminal of R3 by conductor 35. The cathode 33 of tube T1 is grounded at G", and the anode or plate 32' of tube T2 connects through capacitor C3 to the right-hand terminal of R4. Conversely, when tube T1 is conducting, it applies a negative bias to the grid 31' of tube T2 and prevents T2 from conducting.

With T2 conducting, however, during the cut-off of T1, relay RY1 is energized since it is in series with the plate circuit supply voltage to tube T2. Previous to the energizing of RY1, capacitor C4 has been charged through a circuit traced from ground G, through the voltage terminals of the secondary windings S2 and S3 of transformer T, through a direct-current-converting rectifier REC1, through contact C and switch II of relay RY1 to a further storage capacitor C4, and then, from capacitor C4 through current-limiting resistor R5 to ground G'''. With RY1 energized, however, switch II moves into contact with contact B. This action then transfers the stored voltage in capacitor C4 to the integrating capacitor C5 which is in parallel with the winding of RY2, and causes load relay RY2 to become energized. It can be seen that when relay RY1 becomes energized, its armature AR also opens switch I from engagement with contact I', which opens the input circuit 5 to the amplifier T1 in the signal transmission system 6. This action simulates loss of the principal signal at the input 5 of the amplifier and causes tube T1 to conduct, due to the removal of the negative potential bias upon the grid 31 by the opening of the input circuit. Tube T1, in conducting, causes tube T2 to cease conducting, as before explained, which, in turn, causes relay RY1 to become de-energized. Relay RY1, in releasing, causes its armature AR to move switch II back into engagement with contact C, which again causes C4 to become charged through the circuit previously described. Relay RY2, however, does not release during the relatively brief periods that C4 is being re-charged, because the stored energy in C5 will hold RY2 energized for a predetermined period longer than those periods of re-charge. Relay RY1, in releasing, also causes switch I to engage contact I' which will restore the principal signal to the amplifier input 5 and again cause relay RY1 to operate.

Thus, a repetitive self-checking action occurs only so long as the principal signal appears at the input 5 and the monitoring system 6 remains operative. This cycling action of the checking relay RY1 provides a checking signal which is monitored, sensed, detected or recovered by the integrating capacitor C5 and relay RY2, which remain energized only approximately so long as the checking signal is present; i.e. for a period of time substantially equal to (preferably just greater than) the period or periods of repetition of the checking signal. This self-checking, fail-safe technique is more fully described, for example, in the said Letters Patent No. 2,798,213.

When relay RY2 became energized, as before described, the action of switch II engaging contact C causes sequence relay RY4 also to become energized. This energizing circuit may be traced from ground G'''' through switch III and contact C' of relay RY2, by way of the input lead conductor 37 to the sequence relays, to switch IV, engaging contact C" of relay RY3, by conductor 38 through the winding of relay RY4, through the rectifier REC2 and its protective resistor R6, and, by conductor 39, to the A.C. line. Relay RY4 in thus operating, closes its switch V into engagement with contact B''' which, in turn, closes a circuit to energize indicator LP1 and provide a normal operating indication of the monitored condition. This energizing circuit is traced from the H side of the "AC line," by conductor 39, through contact B''' and switch V of RY4, by conductor 40, through LP1, and thence by conductor 41 through switch IV' and contact B'' of relay RY3 to ground G'''''. When switch IV engages contact C" of relay RY3, it places a ground shunt across the winding of RY3 to prevent its operation at this time. It can be seen that ground from switch V' and contact C''' of relay RY4 appears at one side of the winding of RY3 and ground from switch III and contact C' of relay RY2 appears at the other side of the winding of RY3, and operation at this time is thus prevented. Thus, during normal operation, the normal indication LP1 is given, which indicates that the monitored condition is normal. Relays RY2 and RY4 are maintained energized and the self-checking relay RY1 is continuously pulsing.

MONITORING SYSTEM FAILURE CONDITION—FIG. 4

With the monitoring system in normal operation, as described above, let it be assumed that a component fails therein. A failure of any nature, safe or unsafe, will always result in causing the self-checking relay RY1 to cease pulsing and, depending upon the type of failure, RY1 will remain in either of its two positions—energized or de-energized. As the checking signal no longer exists, relay RY2 will release. In releasing, relay RY2 removes the shunt ground on the lower end of the winding of RY3 that was previously placed on the input wire 37 to the sequence relays. This ground, as pointed out above, under normal operation, was from switch III and contact C' of relay RY2, over the input lead 37 of the sequence relays to switch IV and contact C" of relay RY3, and to the lower end of the winding of RY3. Relay RY3 will operate, as its coil is now in series with the energized coil of relay RY4. In operating relay RY3 closes further switch IV''' into engagement with grounded contact F, which energizes a circuit path 22, including a rectifier REC3 and limiting resistor R7, for applying to the amplifier input 5 a simulated flame signal. This circuit path 22 is connected to the flame sensor output 4 in order that the wiring between the sensor output and the amplifier input may be checked. As previously pointed out, the principal flame signal is a small D.C. current of negative polarity, Rectifier REC3 provides the rectification to supply the negative simulated D.C. signal and resistor R7 limits the current to the amount normally supplied by the flame-probe circuit. This simulation circuit is traced from ground through contact F and switch IV" of relay RY3, through resistor R7, rectifier REC3, circuit path 22 capacitor C1 and then the secondary winding S2 of transformer T to ground G. In this manner, the simulated principal signal is applied to the input 5 of the monitoring system 6. Due to the fact, however, that the monitoring system has failed, there will be no response to this failure discriminating test signal. An indicating signal will now be presented to show that the monitoring system itself has failed. This circuit is traced from ground G'''' through switch III and contact B' of relay RY2, by conductor 43 through indicator LP2, and by switch V and contact B''' of relay RY4 to the H side of the "A.C. Line". When the monitoring system has failed, thus, indicators LP1 and LP2 will both be energized, the energizing circuit for LP1 having been previously discussed. Indicator LP1 indicates that the monitored condition or process was normal at the time the monitoring system failed, and indicator LP2 indicates that the monitoring system itself has failed.

A control circuit associated with the indicating system of this invention could readily be arranged whereby, in the example of this disclosure, the fuel valve at the region labelled "Fuel Supply" for the "Burner" would remain energized (by a relay similiar to LP2', but conected with LP1), only so long as the LP1 indicator was energized. As pointed out before, the LP1 circuit is energized both during normal operation and during failure of the monitoring system. As will be later pointed out, the LP1 circuit will not be energized when the monitored principal signal itself fails. Thus, under the above two conditions of normal operation and monitoring system failure, the fuel valve would remain energized and not cause the process that is being controlled by the flame unnecessarily to be interfered with. It might also be desirable at this time for the suggested control-signal manifestation indicative of monitoring system failure to function to actuate a standby monitoring system, such as 6', before mentioned, and thus prevent continued unmonitored operation of the process or condition. The above monitoring system failure results in the energizing of relays RY3, RY4, energizing indicators LP1 and LP2, with the self-checking relay RY1 being quiescent.

MONITORED CONDITION FAILURE—FIG. 4

Loss of the principal monitored signal at the input of the monitoring system results in the checking relay RY1 becoming de-energized. This, in turn, causes the checking signal produced by RY1 to cease. The checking signal recovery relay RY2 will also become de-energized upon loss of the checking signal. Exactly in the manner dscribed under "monitoring system failure condition" above, sequence relay RY3 will become energized and cause a simulated principal signal to be applied to the input 5 of the monitoring system 6. In this present case, however, the monitoring system did not fail but, instead, the monitored principal signal was lost. The simulated principal signal now applied to the input, therefore, will cause the checking relay RY1 to become re-energized. Upon the re-operation of relay RY1, the energy transfer circuit from capacitor C4 to RY2 will be closed and, as previously described under "normal operating condition," RY2 will re-operate. RY2 in operating, will close a circuit to energize the indicator LP3, which circuit may be traced from the H side of the A.C. line, by conductor 39, through contact B''' and switch of relay RY4, by conductor 40 through LP3, by conductor 44 and through contact E'' and switch IV of relay RY3, and through contacts C' and switch III of relay RY2 to ground G''''. Thus, the LP3 indicating or alarm circuit will be energized to show that the monitored signal has failed to appear at the input of the monitoring system. The energizing circuits for the other indicators being now open, due to RY2 and RY3 being energized, the principal danger signal only will be given, which is the energization of only the LP3 indicator. This indicating signal is of prime importance because the principal function of the monitoring system itself is to detect the loss of the signal or condition monitored. Again, as pointed out above under "monitoring system failure condition," suitable control relays, such as LP2', may easily be employed in connection with the indicating system of the invention to perform any control, alarm, regulating or other signal-manifestation function as deemed necessary for any given application of the invention, the term "indicating" generically describing all such operations. The above-monitored condition failure results in relays RY2, RY3 and RY4 being energized, alarm or indicating circuit LP3 energized and RY1 pulsing as long as the simulated principal signal appears at the input of the signal transmission system.

The following table summarizes the relay operation:

CONDITIONS OF SEQUENCE OR MEMORY RELAYS RY3, RY4

| Relays | Normal Operation | Control Failure | Flame Failure |
|---|---|---|---|
| RY2 | Energized | De-energized | Energized. |
| RY3 | De-energized | Energized | Energized. |
| RY4 | Energized | Energized | Energized. |
| Indication | LP-1-"On" | LP1, LP2-"On" | LP3-"On." |

ACTION OF PULSATING SWITCHING RELAY RY1

| | Pulsing from flame signal. | Quiescent | Pulsing from simulated flame signal. |
|---|---|---|---|

As is explained in the said Letters Patent, other types of switching or relay means than the particular electro-mechanical switches or oscillating relays RY1, RY2, RY3, RY4 may be employed, as it well known, and further modifications will also occur to those skilled in the art, all such being considered to fall within the spirit and scope of the invention as defined in the appended claims.

What is claimed is:

1. In combination with a system in which a signal is to be transmitted between the input and output of the system, means for applying to the input a repetitively modified signal, means connected to the output for responding to the recovery therein of the repetitively modified signal and for producing a predetermined output signal condition when said modified signal is absent from said output upon a failure in the system or a loss of the signal, means responsive to the predetermined output signal condition for injecting into the input a simulation of the said signal, means operable in the event of failure of said responding means to respond to the simulated signal for indicating a failure in the system, and means operable in the event of response of the responding means to the simulated signal for indicating loss of the first-mentioned signal.

2. The combination of claim 1 and in which the signal applying means comprises means responsive to the output of said system and said injecting means comprises means responsive to said responding means.

3. The combination of claim 1 and in which said signal applying means comprises a signal modifier external to said input and said injecting means comprises means responsive to said responding means.

4. The combination of claim 3, further comprising means for controlling said external signal modifier from the said system output.

5. The combination of claim 3, further comprising means for controlling said external signal modifier from an independent source external to said system.

6. The combination of claim 1 and in which said signal applying means comprises a signal modifier external to said input, and said injecting means comprises a generator controlled by said responding means, 7. The combination of claim 6 and in which said generator is connected to the signal modifier.

8. The combination as claimed in claim 6 and in which said generator is connected to the system input.

9. The combination as claimed in claim 1, further comprising a standby monitoring system, and control circuit means responsive to a failure in the system for operating said standby monitoring system.

10. In combination with a system in which a signal is to be transmitted between the input and output of the system representative of an event-to-be-detected repetitively modified at a rate or rates corresponding to a period or periods of repetition less than a predetermined time interval, an event-detecting device connected with said input for producing the said repetitively modified signal in the presence of the event-to-be-detected, means connected to the output for responding to the repetitively modified signal, means operable in the event of failure of said responding means to respond to said repetitively modified signal for a time substantially equal to the said predetermined time interval for thereupon indicating such failure by a predetermined output signal condition, and means responsive to the said predetermined output signal condition for distinguishing between such failure resulting from loss of the event-to-be-detected and such failure resulting from a defect in said system.

11. In combination with a system in which a signal is to be transmitted between the input and output of the system representative of an event-to-be-detected repetitively modified at a rate or rates corresponding to a period or periods of repetition less than a predetermined time interval, an event-detecting device connected with said input for producing the said repetitively modified signal in the presence of the event-to-be-detected, means connected to the output for responding to the repetitively modified signal, means operable in the event of failure of said responding means to respond to said repetitively modified signal for a time substantially equal to the said predetermined time interval for thereupon indicating such failure by a predetermined output signal condition, means responsive to the said predetermined output signal condition for injecting into the input a simulated signal corresponding to the event-to-be-detected, means operable in the event of failure thereupon of said responding means to respond to the simulated signal in the output for indicating a defect in the system, and means operable in the event of response of said responding means to the simulated signal in the output for indicating loss of the event-to-be-detected.

12. A fail-safe system for preventing false effective energization of an electrical load through integrity failure of any of the components of the system having, in combination, voltage terminals energizable with alternating-current potential, rectifier means for converting said potential to direct-current potential during energization from said voltage terminals, capacitor means connected with said rectifier means for storing the converted potential, switching means having multiple positions, means for operating said switching means recurrently between its positions at a predetermined frequency in response to a principal signal, said switching means being arranged in one of its positions to switch said voltage terminals to said rectifier means and capacitor means in order to permit said capacitor means to store the converted potential, said switching means being further arranged in another of its positions to disconnect the rectifier means from the capacitor means, a load that, with respect to the half-period of the said predetermined frequency, is slowly deenergizable and is adapted to be responsive to direct-current potential and arranged to be effectively energized from said stored converted potential during the recurrent periods that the rectifier means is disconnected from the capacitor means, means controlled by the load for feeding a signal simulating the principal signal to operate the switching means in event of cessation of the recurrent operation thereof, and means responsive to renewal of said recurrent operation for indicating failure of the principal signal and responsive to continued cessation of said recurrent operation for indicating failure of a component of the system.

13. A fail-safe system as claimed in claim 12, further comprising additional means for indicating normal operation of said system, said load comprising further switching means for controlling said additional indicating means.

14. In combination with an electrical system in which a principal signal modified by a repetitive checking signal having a predetermined rate or rates of repetition is transmitted from the input to the output of the system, said output having switching means responsive to the checking signal for repetitively occupying alternate positions at said repetition rate or rates, means for supplying alternating-current potential, means for converting alternating-current potential into direct-current potential, potential-storing means, an electric circuit operative when the switching means occupies one of its positions to connect together the supplying means, the converting means, and the storing means, in order to store direct-current potential in the storing means, a direct-current-operated load adapted to respond after the elapse of a period greater than the period or periods of the said repetition rate or rates, a further electric circuit operative when the switching means occupies the alternate position to connect the potential-storing means to the load, discriminating means controlled by the load for feeding a signal simulating the principal signal to said input upon cessation of the repetitive switching of said switching means and the resulting response of said load, and means operative upon continued response of said load for indicating failure of a component of the system and operative upon renewal of the repetitive switching of the switching means for indicating failure of the principal signal itself.

15. The combination as claimed in claim 14 and in which the said load comprises further switching means, and means controlled by said further switching means for indicating normal operation of said system in response to said repetitive switching, said discriminating means comprising additional switching means for controlling said means for indicating failure of a component and failure of the principal signal.

16. The combination as claimed in claim 15, further comprising a standby monitoring system controlled by said additional switching means.

17. The combination of claim 15 and in which said additional switching means in one position operates means for generating said simulated signal and feeding the same to said system input.

18. The combination as claimed in claim 17 and in which said principal signal is a signal representative of a flame and the like, and said generating means comprises a circuit for producing a signal simulating the principal signal produced by the flame and the like.

19. The combination as claimed in claim 14 and in which said indicating means comprises a plurality of indicating devices, one producing an indication of normal operation, a second producing an indication of failure of the system, and a third producing an indication of failure of the principal signal itself.

20. In combination with a signal transmission system for transmitting between its input and output a principal signal, means connected to the input of said system for sensing said principal signal and applying it to said input, checking means for repetitively modifying the principal signal applied to said input from said sensing means, recovering means connected to the output of said system for recovering the modification of said signal and upon failure to recover said modification for thereupon providing a first control signal, discriminating means responsive to said first control signal and for thereupon applying a simulated principal signal to said input, means operable in the event of response of said recovery means to the presence of said simulated principal signal at said output for providing a second control signal, indicating means responsive to said second control signal for indicating that loss of the principal signal at the input of said system has occurred, and means operable upon failure of said recovery means to respond to said simulated signal for thereupon indicating that failure in the said signal transmission system has occurred.

21. The combination as claimed in claim 20, further comprising indicating means for indicating normal operation of said system in response to recovery of said modification by said recovering means.

References Cited by the Examiner

UNITED STATES PATENTS

| | | | |
|---|---|---|---|
| 2,728,069 | 12/55 | Norton | 340—228 |
| 2,747,112 | 5/56 | Deziel et al. | 158—28 XR |
| 2,779,936 | 1/57 | Loudon et al. | 340—213 RX |
| 2,782,405 | 2/57 | Weisz et al. | 340—213 |
| 2,798,213 | 7/57 | Rowell | 340—213 |
| 2,807,008 | 9/57 | Rowell | 340—213 |
| 2,865,444 | 12/58 | Deziel. | |
| 2,968,802 | 1/61 | Flory et al. | 340—248 |

NEIL C. READ, *Primary Examiner.*

BENNETT G. MILLER, *Examiner.*